US012668653B2

(12) United States Patent
Song et al.

(10) Patent No.: US 12,668,653 B2
(45) Date of Patent: Jun. 30, 2026

(54) POLYETHYLENE

(71) Applicant: LG CHEM, LTD., Seoul (KR)

(72) Inventors: Christine Jisoo Song, Daejeon (KR); Jiwon Yoon, Daejeon (KR); Yi Young Choi, Daejeon (KR); Sunghyun Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 691 days.

(21) Appl. No.: 18/019,232

(22) PCT Filed: Oct. 21, 2021

(86) PCT No.: PCT/KR2021/014812

§ 371 (c)(1),
(2) Date: Feb. 1, 2023

(87) PCT Pub. No.: WO2022/092704

PCT Pub. Date: May 5, 2022

(65) Prior Publication Data

US 2023/0272134 A1 Aug. 31, 2023

(30) Foreign Application Priority Data

Oct. 30, 2020 (KR) ........................ 10-2020-0143717
Oct. 20, 2021 (KR) ........................ 10-2021-0140284

(51) Int. Cl.

*C08F 210/16* (2006.01)
*C08F 4/659* (2006.01)
*C08F 4/6592* (2006.01)
*C08F 210/14* (2006.01)

(52) U.S. Cl.

CPC ........ *C08F 210/16* (2013.01); *C08F 4/65916* (2013.01); *C08F 4/6592* (2013.01)

(58) Field of Classification Search

None
See application file for complete search history.

(56) References Cited

U.S. PATENT DOCUMENTS

2006/0287449 A1 12/2006 Miyamoto et al.
2007/0134478 A1 6/2007 Haberer et al.
2015/0011702 A1 1/2015 van den Esschert et al.
2015/0141599 A1 5/2015 Greco
2015/0266985 A1 9/2015 Uhm et al.
2017/0260304 A1 9/2017 Al-Shammari et al.
2019/0002602 A1 1/2019 Patel et al.
2020/0095404 A1 3/2020 Jarumaneeroj et al.
2021/0032449 A1 2/2021 Park et al.
2022/0106466 A1* 4/2022 Wang .................... C08F 210/02

FOREIGN PATENT DOCUMENTS

CN 111454300 A 7/2020
EP 2797966 B1 1/2020
JP 3483171 B2 1/2004
JP 5418947 B2 2/2014
KR 10-2019-0074963 A 6/2019
KR 10-2020-0101873 A 8/2020
RU 2728873 C1 7/2020
WO 2014/077617 A1 5/2014
WO 2016/037960 A1 3/2016
WO 2017/139096 A1 8/2017
WO 2020/171623 A1 8/2020
WO WO-2020157619 A1 * 8/2020 .......... C08L 23/0815

OTHER PUBLICATIONS

International Search Report (with translation) and Written Opinion dated Jan. 25, 2022, issued in corresponding International Patent Application No. PCT/KR2021/014812.
Wente et al., "Manufacture of Superfine Organic Fibers," Naval Research Laboratory, Report No. 4364, May 25, 1954.
Extended European Search Report issued Dec. 19, 2023 for European Patent Application No. 21886698.6.

* cited by examiner

*Primary Examiner* — Ha S Nguyen
(74) *Attorney, Agent, or Firm* — Morgan, Lewis & Bockius LLP

(57) ABSTRACT

Provided is a polyethylene. More particularly, provided is a polyethylene which has excellent abrasion resistance and thus is suitable for fiber production.

10 Claims, No Drawings

POLYETHYLENE

CROSS-REFERENCE TO RELATED APPLICATION

The present application is based on, and claims priority from, Korean Patent Application Nos. 10-2020-0143717 and 10-2021-0140284, filed on Oct. 30, 2020 and Oct. 20, 2021, respectively, the disclosures of which are hereby incorporated by reference herein in their entirety.

BACKGROUND OF THE INVENTION

(a) Field of the Invention

The present invention relates to a polyethylene. More particularly, the present invention relates to a polyethylene which has excellent abrasion resistance and thus is suitable for fiber production.

(b) Description of the Related Art

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that a molecular weight distribution of polymers is broad. Also, since compositional distribution of comonomers is not uniform, there is a problem in that it has a limitation in securing the desired physical properties.

In contrast, the metallocene catalyst consists of a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform composition distribution of comonomers, depending on the single site characteristics.

On the other hand, a polypropylene resin used as a non-woven material has excellent chemical resistance and tensile strength and has been mainly used as a surface material for hygiene products such as diapers, sanitary napkins, etc. However, a homopolypropylene resin has a disadvantage of giving a rough feel on the surface of nonwoven fabrics, because it generally has a low content of a low-molecular-weight copolymer and a low xylene solubility.

In order to improve the texture of the surface, a bicomponent fiber, in which a polypropylene resin was used for the interior and a polyethylene resin was used for the exterior, was produced by mixing the polypropylene resin with the polyethylene resin, and has been used as a nonwoven material having improved texture and softness. In addition, to provide convenience to users by improving the texture and softness of the non-woven fabric, thickness of spun yarns to be used has been decreased.

Accordingly, to secure excellent tensile strength and softness during the preparation of polyethylene used for the bicomponent fiber, development of polyethylene with a narrow molecular weight distribution and a reduced dust generation is further required.

SUMMARY OF THE INVENTION

To solve the above problems of the prior art, there is provided a polyethylene which has a narrow molecular weight distribution and a low crystallinity within a similar melt index (MI) range, thereby having the increased effective number of physical cross-links of molecules, and has a reduced lint and dust generation during a drawing process, thereby having improved abrasion resistance.

To achieve the above object, there is provided a polyethylene satisfying the following conditions of 1) to 4):

1) a melt index (MI) of 0.5 g/10 min to 40 g/10 min, as measured at 190° C. under a load of 2.16 kg according to ASTM D1238;
2) a molecular weight distribution (MWD) of 2.3 to 2.6;
3) a crystallinity of 63% to 71%, as measured using a differential scanning calorimeter (DSC) according to ASTM F2625; and
4) a crystal relaxation temperature ($T_{cr}$) of 42° C. to 50° C., as measured using dynamic mechanical analysis (DMA).

According to the present invention, provided is a polyethylene which has a narrow molecular weight distribution and a low crystallinity, as compared with the existing polyethylene having a similar melt index (MI), thereby having the increased effective number of physical cross-links of molecules and having improved abrasion resistance.

Further, the polyethylene according to the present invention has a reduced lint or dust generation during a drawing process, thereby also having improved abrasion resistance.

Accordingly, the polyethylene according to the present invention may be usefully applied to production of fiber products such as diapers, masks, various sanitary materials, medical fibers, and other general consumer goods.

DETAILED DESCRIPTION OF THE EMBODIMENTS

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

The present invention may be variously modified and have various forms, and specific exemplary embodiments will be described and explained in detail below. However, it is not intended to limit the present invention to the specific exemplary embodiments and it must be understood that the present invention includes every modifications, equivalents, or replacements included in the spirit and technical scope of the present invention.

Hereinafter, a polyethylene of the present invention will be described in detail.

The polyethylene according to one embodiment of the present invention is characterized by satisfying the following conditions of 1) to 4): 1) a melt index (MI) of 0.5 g/10 min to 40 g/10 min, as measured at 190° C. under a load of 2.16 kg according to ASTM D1238; 2) a molecular weight distribution (MWD) of 2.3 to 2.6; 3) a crystallinity of 63% to 71%, as measured using a differential scanning calorimeter (DSC) according to ASTM F2625; and 4) a crystal relaxation temperature ($T_{cr}$) of 42° C. to 50° C., as measured using dynamic mechanical analysis (DMA).

During preparation of a polyethylene used in a bicomponent fiber, in which a polypropylene resin is used for the interior and the polyethylene resin is used for the exterior, it is required to develop a polyethylene with a narrow molecular weight distribution and a reduced dust generation in order to secure excellent tensile strength and softness.

On the other hand, during preparation of polyethylene fibers, when a low-molecular-weight component in polyethylene decreases, polymer chain entanglement more effectively occurs, and thus abrasion resistance tends to increase. Therefore, as the low-molecular-weight component is smaller and the molecular weight distribution is narrower, better abrasion resistance may be achieved. However, when the low-molecular-weight component is too small, filterability during fiber spinning is deteriorated, resulting in single yarns and binding yarns, and there is a problem in that the surface uniformity of the fibers is reduced.

As the crystal relaxation temperature, which represents strength and uniformity of the crystal structure of polyethylene, is lower, brittleness is lower, and thus lint or dust generation may be reduced during a fiber drawing process, and abrasion resistance of a final fiber product may be increased. Therefore, even among polyethylenes which are similar in the molecular weight distribution, there may be a large difference in the abrasion resistance depending on the crystal relaxation temperature.

Hereinafter, the polyethylene of the present invention will be described in more detail.

1) Melt Index (MI)

The polyethylene according to one embodiment of the present invention has a melt index (MI) of 0.5 g/10 min to 40 g/10 min, as measured at 190° C. under a load of 2.16 kg according to ASTM D1238.

More specifically, the melt index (MI) of the polyethylene according to one embodiment of the present invention may be 0.5 g/10 min or more, or 1.0 g/10 min or more, or 5 g/10 min or more, or 10 g/10 min or more, or 15 g/10 min or more, or 18 g/10 min or more, and 40 g/10 min or less, or 35 g/10 min or less, or 30 g/10 min or less, or 25 g/10 min or less, or 20 g/10 min or less.

By having the melt index as above, the molecular weight and viscosity of the polyethylene may be optimized, and spinnability may be improved during fiber production.

2) Molecular Weight Distribution (MWD)

The polyethylene according to one embodiment of the present invention has a molecular weight distribution (MWD, Mw/Mn) of 2.3 to 2.6.

More specifically, the molecular weight distribution of the polyethylene according to one embodiment of the present invention may be 2.3 or more, or 2.35 or more, or 2.4 or more, and 2.6 or less, or 2.55 or less, or 2.5 or less, or 2.45 or less.

Sine the polyethylene of the present invention has a narrow molecular weight distribution relative to the high melt index, polymer chain entanglement may more effectively occur, and thus abrasion resistance may be improved.

In the present invention, with regard to a number average molecular weight (Mn), a weight average molecular weight (Mw), and a molecular weight distribution, the weight average molecular weight (Mw) and the number average molecular weight (Mn) of polyethylene were measured using gel permeation chromatography (GPC), respectively and a ratio (Mw/Mn) of the weight average molecular weight to the number average molecular weight was calculated as the molecular weight distribution.

In detail, a sample of the polyethylene was evaluated using Polymer Laboratories PLgel MIX-B column with a length of 300 mm and Waters PL-GPC220 instrument. The evaluation temperature was 160° C., 1,2,4-trichlorobenzene was used as a solvent, and the flow rate was set to 1 mL/min. The sample was prepared at a concentration of 10 mg/10 mL, and fed in an amount of 200 μL. A calibration curve formed using polystyrene standards was used to measure Mw and Mn values. 9 kinds of polystyrene standards having a weight average molecular weight of 2,000/10,000/30,000/70,000/200,000/700,000/2,000,000/4,000,000/10,000,000 were used.

3) Crystallinity

The polyethylene according to one embodiment of the present invention has a crystallinity of 63% to 71%, as measured using a differential scanning calorimeter (DSC) according to ASTM F2625.

More specifically, the crystallinity of the polyethylene according to one embodiment of the present invention may be 63% or more, or 65% or more, or 68% or more, and 71% or less, or 70% or less, or 69% or less.

Crystallinity is an index showing thermal properties of polyethylene. Since the polyethylene of the present invention has a low crystallinity relative to the high melt index as above, the effective number of physical cross-links of molecules increases, and thus, the polyethylene may exhibit better abrasion resistance.

For the method of measuring the crystallinity, reference may be made to ASTM F2625, and the method will be explained in more detail in Examples to be described later.

4) Crystal Relaxation Temperature ($T_{cr}$)

The polyethylene according to one embodiment of the present invention has a crystal relaxation temperature ($T_{cr}$) of 42° C. to 50° C., as measured using dynamic mechanical analysis (DMA).

More specifically, the crystal relaxation temperature ($T_{cr}$) of the polyethylene according to one embodiment of the present invention may be 42° C. or higher, or 43° C. or higher, or 44° C. or higher, and 50° C. or lower, or 49° C. or lower, or 48° C. or lower, or 47° C. or lower.

The crystal relaxation temperature is an index that can predict strength and uniformity of the crystal structure of polyethylene. Since the polyethylene of the present invention has a low crystal relaxation temperature relative to the high melt index as above, brittleness is reduced during a drawing process, and thus lint or dust generation may be reduced. Accordingly, fibers including the polyethylene of the present invention may exhibit excellent abrasion resistance.

The crystal relaxation temperature may be measured using dynamic mechanical analysis (DMA), and will be explained in more detail in Examples to be described later.

The method of measuring the crystal relaxation temperature will be explained in more detail in Examples to be described later.

5) Abrasion Resistance

The above-described polyethylene of the present invention has abrasion resistance of 0.2 mg/cm$^3$ or less, as measured according to ASTM D5264.

More specifically, the abrasion resistance of the polyethylene according to one embodiment of the present invention may be 0.1 mg/cm$^3$ or more, or 0.11 mg/cm$^3$ or more, or 0.12 mg/$cm^3$ or more, and 0.2 mg/$cm^3$ or less, or 0.18 mg/$cm^3$ or less, or 0.16 mg/$cm^3$ or less, or 0.14 mg/$cm^3$ or less.

The polyethylene of the present invention has excellent abrasion resistance as described above, and thus may be usefully applied to production of fiber products such as diapers, masks, various sanitary materials, medical fibers, and other general consumer goods.

The method of measuring the abrasion resistance will be explained in more detail in Examples to be described later.

6) Other Physical Properties

The polyethylene according to one embodiment of the present invention preferably has a melt flow rate ratio (MFRR, $MI_5/MI_{2.16}$) of 2 to 3.

The MFRR is a value obtained by dividing a melt index ($MI_5$) measured for the polyethylene at 190° C. under a load of 5 kg according to ASTM D1238 by a melt index ($MI_{2.16}$) measured at 190° C. under a load of 2.16 kg.

More specifically, the melt flow rate ratio (MFRR) of the polyethylene, as measured at 190° C. according to ASTM D1238, may be 2.2 or more, or 2.3 or more, or 2.4 or more, or 2.5 or more, and 2.90 or less, or 2.85 or less, or 2.7 or less, or 2.56 or less.

Since the polyethylene has the narrow range of the melt flow rate ratio as above, the polyethylene of the present invention may achieve excellent filterability and an improved process yield.

Further, the polyethylene may be a high-density polyethylene (HDPE) satisfying a density (ASTM D1505, 23° C.) of 0.945 g/$cm^3$ to 0.965 g/$cm^3$.

More specifically, the density of the polyethylene may be 0.948 g/$cm^3$ or more, or 0.949 g/$cm^3$ or more, or 0.950 g/$cm^3$ or more, and 0.960 g/$cm^3$ or less, or 0.958 g/$cm^3$ or less, or 0.955 g/$cm^3$ or less, or 0.953 g/$cm^3$ or less.

According to one embodiment of the present invention, the polyethylene may be, for example, a copolymer of ethylene and alpha-olefin. In this regard, the alpha-olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene. Preferably, the polyethylene may be a copolymer of ethylene and 1-butene, a copolymer of ethylene and 1-hexene, or a copolymer of ethylene and 1-octene.

Meanwhile, the polyethylene according to one embodiment of the present invention having physical properties as above may be prepared by a preparation method including polymerizing olefin monomers in the presence of a catalyst composition including a metallocene compound as a catalytically active component.

More specifically, the polyethylene of the present invention may be prepared by, but is not limited to, copolymerizing ethylene and alpha-olefin in the presence of a catalyst composition including a metallocene compound represented by the following Chemical Formula 1:

[Chemical Formula 1]

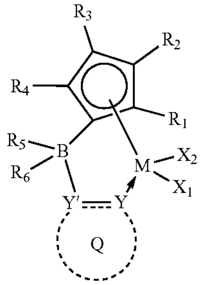

in Chemical Formula 1,

B is boron,

M is a Group 4 transition metal, $R_1$ to $R_4$ are each independently hydrogen, $C_{1-20}$ alkyl, $C_{3-20}$ cycloalkyl, or $C_{6-20}$ aryl, or $R_1$ and $R_2$ or $R_3$ and $R_4$ are connected to each other to form a substituted or unsubstituted $C_{6-60}$ aromatic ring, $R_5$ and $R_6$ are each independently $C_{1-20}$ alkyl, $C_{3-20}$ cycloalkyl, or $C_{6-20}$ aryl, or $R_5$ and $R_6$ are connected to each other to form a $C_{3-60}$ aliphatic ring or a $C_{6-60}$ aromatic ring, $X_1$ and $X_2$ are each independently $C_{1-20}$ alkyl or —O(CO)R', wherein R' is $C_{1-20}$ alkyl, Q is a substituted or unsubstituted $C_{2-60}$ hetero ring including any one or more selected from the group consisting of N, O, and S, Y and Y' are elements constituting Q, Y is N, O, or S, Y' is an element of Q, and is adjacent to Y, and is N or C.

In the specification, the following terms may be defined as follows unless specifically limited.

The halogen may be fluorine (F), chlorine (Cl), bromine (Br), or iodine (I).

The alkyl may be linear or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, the $C_{1-20}$ alkyl may be a methyl group, an ethyl group, an n-propyl group, an iso-propyl group, an n-butyl group, an iso-butyl group, a tert-butyl group, an n-pentyl group, an iso-pentyl group, etc., but is not limited thereto. Meanwhile, in the present specification, "iPr" means an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, the cycloalkyl may be cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, etc., but is not limited thereto. Meanwhile, in the present specification, "Cy" means cycloalkyl having 3 to 6 carbon atoms.

The alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl, or $C_{5-10}$ cyclic alkenyl. More specifically, the $C_{2-20}$ alkenyl may be ethenyl, a propenyl, a butenyl, a pentenyl, or a cyclohexenyl, etc.

The alkoxy may be linear, branched, or cyclic alkoxy. Specifically, the $C_{1-20}$ alkoxy may be $C_{1-20}$ linear alkoxy; $C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, or cycloheptoxy, etc., but is not limited thereto.

The alkoxyalkyl has a structure including —Ra—O—Rb, and may be a substituent in which one or more hydrogens of alkyl(—Ra) are substituted with alkoxy(—O—Rb). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, etc., but is not limited thereto.

The aryl includes monocyclic, bicyclic, or tricyclic aromatic hydrocarbons. According to one embodiment of the present invention, the aryl may have 6 to 60 carbon atoms or 6 to 20 carbon atoms, and the aryl may be specifically phenyl, naphthyl, anthracenyl, dimethylanilinyl, anisolyl, etc., but is not limited thereto.

The heteroaryl is heteroaryl including one or more of N, O, and S as a heteroatom, and the number of carbon atoms may be, but is not particularly limited to, 2 to 60 or 2 to 20. Examples of the heteroaryl may include xanthene, thioxanthen, thiophene, furan, pyrrole, imidazole, thiazole, oxazole, oxadiazole, triazole, pyridyl, bipyridyl, pyridinyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, etc., but are not limited thereto.

The hydrocarbyl group means a monovalent hydrocarbon compound, and includes an alkyl group, an alkenyl group, an alkynyl group, an aryl group, an aralkyl group, an aralkenyl group, an aralkynyl group, an alkylaryl group, an alkenylaryl group, an alkynylaryl group, etc. For example, the hydrocarbyl group may be linear, branched, or cyclic alkyl. More specifically, the hydrocarbyl group having 1 to 30 carbon atoms may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as phenyl, biphenyl, naphthyl, anthracenyl, phenanthrenyl, fluorenyl, etc. Moreover, it may be alkylaryl such as methylphenyl, ethylphenyl, methylbiphenyl, methylnaphthyl, etc., or arylalkyl such as phenylmethyl, phenylethyl, biphenylmethyl, naphthylmethyl, etc. It may also be alkenyl such as allyl, ethenyl, propenyl, butenyl, pentenyl, etc.

The hetero ring includes all of aliphatic rings including any one or more selected from the group consisting of N, O, and S, and aromatic rings including any one or more selected from the group consisting of N, O, and S.

Further, the Group 4 transition metal may be titanium (Ti), zirconium (Zr), hafnium (Hf), or rutherfordium (Rf), specifically, titanium (Ti), zirconium (Zr), or hafnium (Hf), and more specifically, zirconium (Zr) or hafnium (Hf), but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; amino; silyl; alkylsilyl or alkoxysilyl; phosphine; phosphide; sulfonate; and sulfone.

The metallocene compound represented by Chemical Formula 1 employs a bridge structure including a boron anion, unlike a CGC-type precursor commonly used. The traditional CGC-type precursor has a neutral bridge structure including silicon so that the ligand unit is negatively charged. Due to a structural limitation caused thereby, there is a problem in that it is difficult to achieve various physical properties during preparation of olefin polymers.

In contrast, the metallocene compound may have a neutral ligand unit because the bridge structure is negatively charged. The ligand unit of the present invention is the hetero ring Q of Chemical Formula 1, wherein Y as an element of Q coordinates with a metal, and Y', as an element of Q, adjacent to Y is connected to the bridge. Accordingly, in the present invention, by employing various neutral ligand units satisfying the above structure, it is possible to prepare a catalyst having higher activity and higher copolymerizability than the existing CGC precursors.

In addition, alkyl or carboxylate is included as a metal substituent of the metallocene compound, which acts as a good leaving group to promote a reaction with a cocatalyst such as MAO, etc., resulting in improvement of activity.

Therefore, when the metallocene compound is used, the high melt index of polyethylene may be maintained, the low-molecular-weight component may be reduced, the molecular weight distribution may be narrow, and the SCB content may be increased to increase the effective number of physical cross-links of molecules, thereby preparing polyethylene having excellent abrasion resistance.

In Chemical Formula 1, M may be preferably zirconium (Zr).

Preferably, $R_1$ to $R_4$ are each independently hydrogen, $C_{1-10}$ alkyl or $C_{6-20}$ aryl, and $R_1$ and $R_2$ or $R_3$ and $R_4$ are connected to each other to form a substituted or unsubstituted $C_{6-20}$ aromatic ring.

More preferably, $R_1$ to $R_4$ are each independently hydrogen, or methyl, or $R_1$ and $R_2$ or $R_3$ and $R_4$ are connected to each other to form a benzene ring or a 1,2,3,4-tetrahydronaphthalene ring, wherein the benzene ring or the 1,2,3,4-tetrahydronaphthalene ring may be unsubstituted or substituted with 1 to 4 substituents selected from the group consisting of methyl, tert-butyl, and 4-tert-butyl phenyl.

Preferably, $R_5$ and $R_6$ are each independently $C_{1-10}$ alkyl, or $C_{6-20}$ aryl, or $R_5$ and $R_6$ are connected to each other to form a $C_{3-20}$ aliphatic ring or a $C_{6-20}$ aromatic ring.

More preferably, $R_5$ and $R_6$ are each independently methyl or phenyl, or $R_5$ and $R_6$ are connected to each other to form a cyclooctane ring.

Most preferably, $R_5$ and $R_6$ may be each phenyl.

Preferably, $X_1$ and $X_2$ may be each independently methyl or acetate.

Preferably, R' may be methyl.

Preferably, $X_1$ and $X_2$ may be the same as each other.

Preferably, Q may be a substituted or unsubstituted $C_{2-20}$ hetero ring including any one or more selected from the group consisting of N, O, and S.

More preferably, Q may be a pyridine ring, a quinoline ring, a 4,5-dihydrooxazole ring, a pyrazole ring, or a benzoxazole ring, wherein Q is unsubstituted or substituted with 1 substituent to 4 substituents selected from the group consisting of methyl, isopropyl, and diphenylamino.

More preferably, Q may be a pyridine ring, a 4,5-dihydrooxazole ring, a pyrazole ring, or a benzoxazole ring, wherein Q is unsubstituted or substituted with 1 substituent to 4 substituents selected from the group consisting of methyl, isopropyl, and diphenylamino.

Y is a hetero atom coordinating with the metal M, and preferably, Y may be N.
Meanwhile, specific examples of the metallocene compound represented by Chemical Formula 1 may include compounds represented by the following structural formulae, but the present invention is not limited thereto:
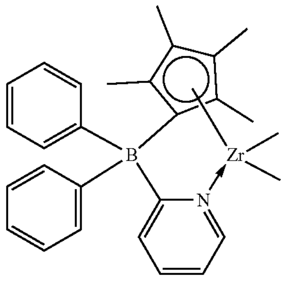
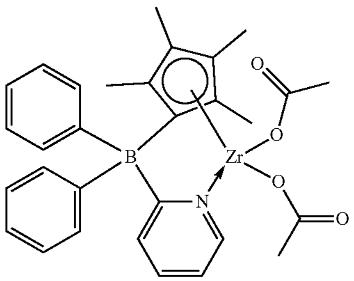
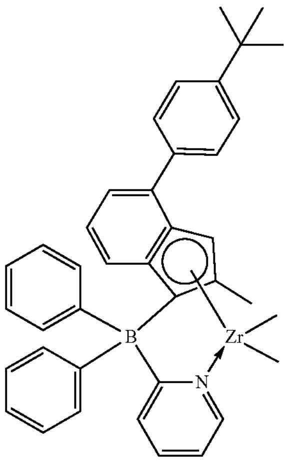
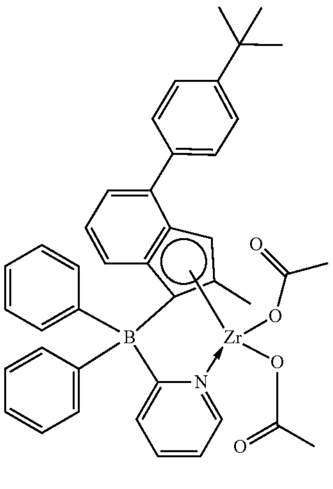
-continued
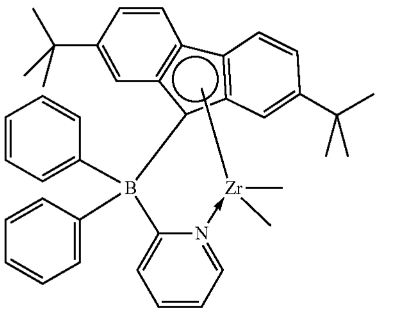
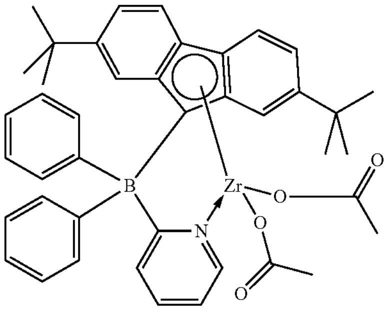
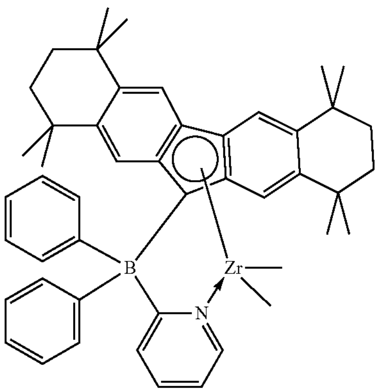
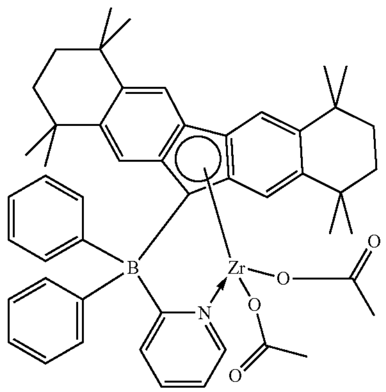
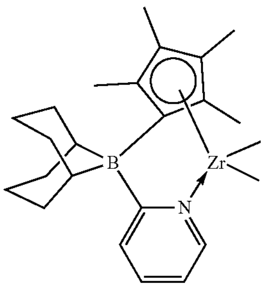

-continued
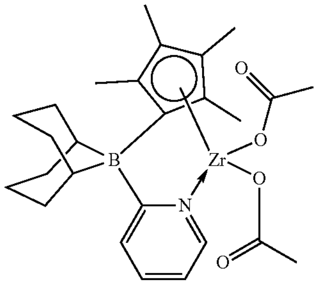
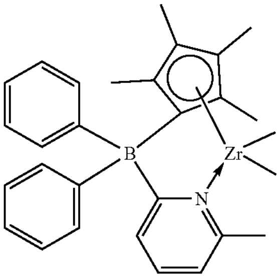
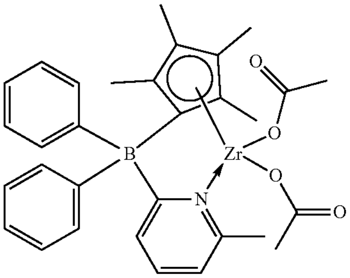
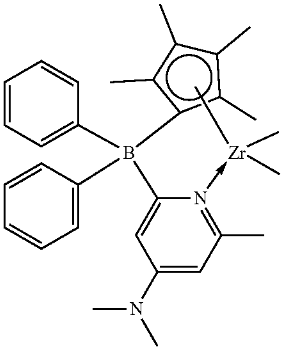
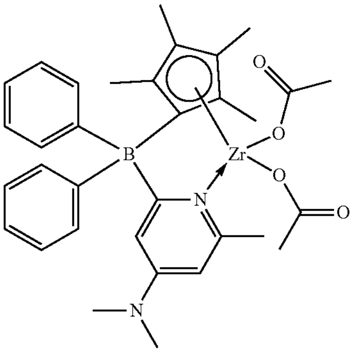
-continued
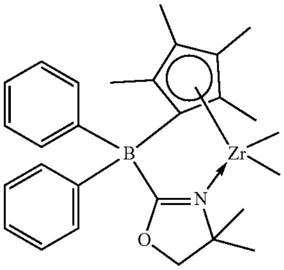
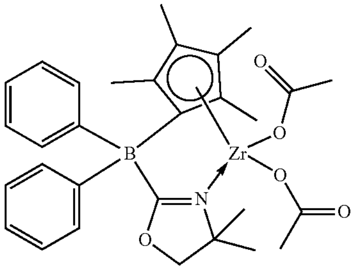
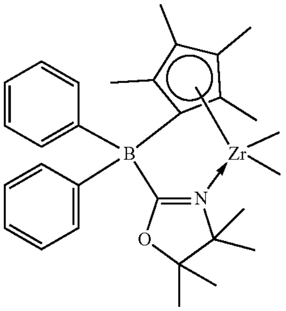
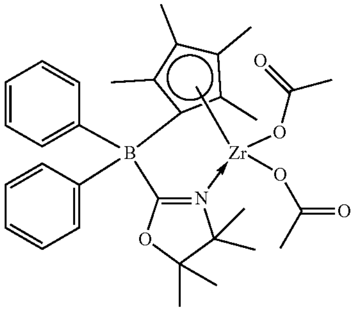
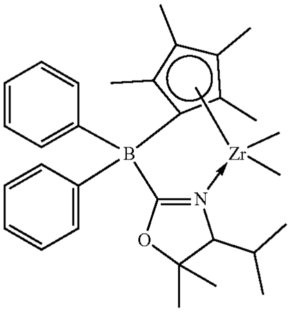

-continued

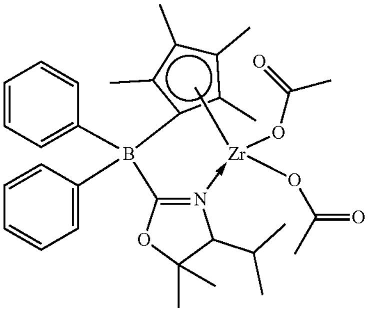

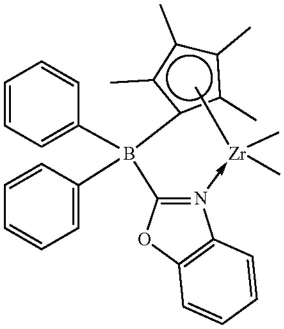

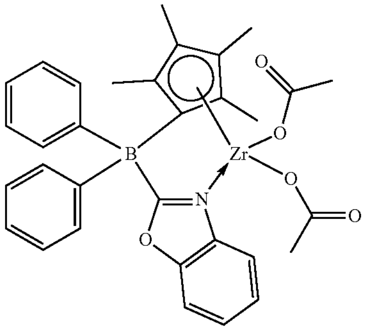

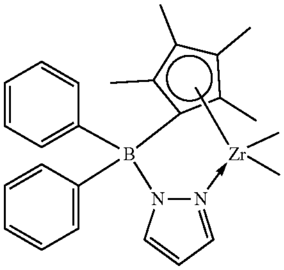

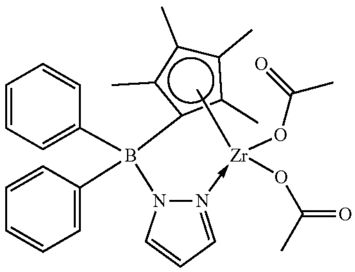

-continued

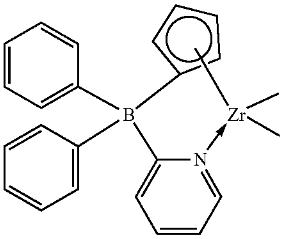

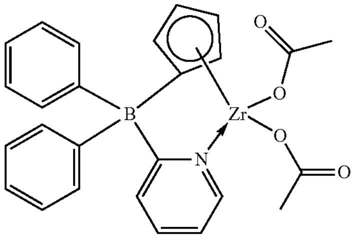

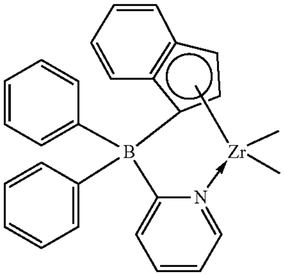

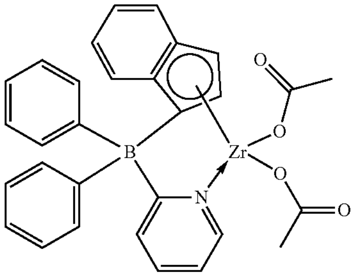

The metallocene compound represented by Chemical Formula 1 may be prepared by a preparation method, for example, as in the following Reaction Scheme 1, when $X_1$ and $X_2$ are the same as each other, but is not limited thereto, and it may be prepared according to known methods of preparing an organic compound and a metallocene compound. The preparation method will be more embodied in Preparation Example to be described later.

[Reaction Scheme 1]

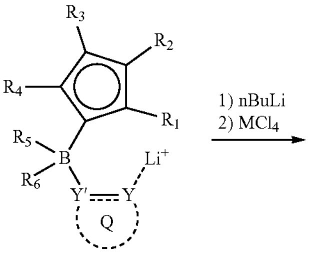

-continued

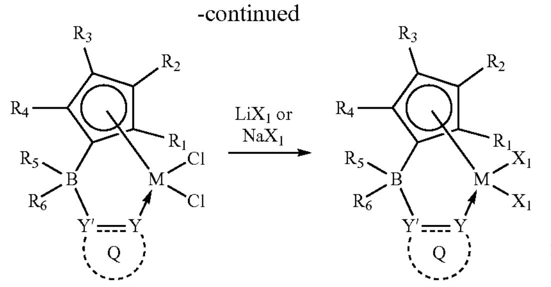

In Reaction Scheme 1, B, M, $R_1$ to $R_6$, $X_1$, $X_2$, Q, Y, and Y' are the same as defined in Chemical Formula 1.

The catalyst composition according to one embodiment of the present invention may include the metallocene compound of Chemical Formula 1 as a single catalyst.

In this regard, the catalyst composition may include the metallocene compound as a single component, or may be in the form of a supported metallocene catalyst including the metallocene compound and a support. When the supported metallocene catalyst is used, it is possible to improve morphology and physical properties of the polyethylene to be prepared, and it may be appropriately used in the traditional slurry polymerization, bulk polymerization, and gas phase polymerization processes.

Specifically, as the support, a support having a highly reactive hydroxyl group, silanol group, or siloxane group on the surface thereof may be used. To this end, those surface-modified by calcination, or those in which moisture is removed from the surface thereof by drying may be used. For example, silica prepared by calcination of silica gel, silica dried at a high temperature, silica-alumina, and silica-magnesia may be used. These may commonly include oxides, carbonates, sulfates, and nitrates, such as $Na_2O$, $K_2CO_3$, $BaSO_4$, $Mg(NO_3)_2$, etc.

The support may be calcined or dried at a temperature of about 200° C. to 600° C. or about 250° C. to 600° C. When the calcination or drying temperature for the support is low, too much moisture remains in the support, and thus it is apprehended that the moisture on the surface may react with the cocatalyst. In addition, a cocatalyst supporting ratio may be relatively high due to excess hydroxyl groups, but this requires a large amount of the cocatalyst. When the drying or calcination temperature is too high, pores on the surface of the support may be combined with each other to reduce surface area, and many hydroxyl groups or silanol groups may be lost from the surface, leaving only siloxane groups. Thus, it is apprehended that reactive sites with the cocatalyst may be reduced.

The amount of the hydroxyl groups on the support surface is preferably 0.1 mmol/g to 10 mmol/g, and more preferably 0.5 mmol/g to 5 mmol/g. The amount of the hydroxyl groups on the support surface may be controlled by a preparation method of the support and preparation conditions, or drying conditions, for example, temperature, time, vacuum or spray drying, etc.

When the amount of hydroxyl groups is less than 0.1 mmol/g, reactive sites with the cocatalyst may be reduced. When the amount of hydroxyl groups is more than 10 mmol/g, it may be caused by moisture besides the hydroxyl groups present on the surface of support particles, which is not desirable.

For example, the amount of hydroxyl groups on the support surface may be 0.1 mmol/g to 10 mmol/g or 0.5 mmol/g to 5 mmol/g. The amount of the hydroxyl groups on the support surface may be controlled by a preparation method of the support and preparation conditions, or drying conditions, for example, temperature, time, vacuum or spray drying, etc. When the amount of hydroxyl groups is too small, reactive sites with the cocatalyst may be reduced. When the amount of hydroxyl groups is too large, it may be caused by moisture besides the hydroxyl groups present on the surface of support particles.

Among the above-mentioned supports, the silica prepared by calcining silica, particularly silica gel, has little catalyst released from the surface of the support in the polymerization process of the propylene, because the functional group of the compound of Chemical Formula 1 is chemically bonded to and supported on the silica support. As a result, when the polyethylene is prepared by slurry or gas-phase polymerization, a fouling phenomenon, in which polymer particles stick to the wall surface of the reactor or with each other, may be minimized.

In addition, when supported on the support, the compound of Chemical Formula 1 may be supported in an amount of about 10 μmol or more, or about 30 μmol or more, and about 100 μmol or less, or about 80 μmol or less, based on the weight of the support, e.g., about 1 g of silica. When supported within the above content range, the supported catalyst may exhibit appropriate activity, which is advantageous in terms of maintaining catalytic activity and economic feasibility.

The catalyst composition may further include one or more cocatalysts together with the above-described metallocene compound and support.

Any cocatalyst may be used as the cocatalyst, as long as it may be used in the polymerization of olefin in the presence of a general metallocene catalyst. Such a cocatalyst allows binding between the hydroxyl groups on the support and a Group 4 transition metal. In addition, since the cocatalyst exists only on the surface of the support, it may contribute to securing the unique properties of the specific hybrid catalyst composition of the present application without a fouling phenomenon in which the polymer particles stick to the wall surface of the reactor or with each other.

Further, the catalyst composition according to the present invention may include one or more cocatalyst compounds selected from the group consisting of compounds represented by the following Chemical Formulae 2 to 4, in addition to the metallocene compound:

$[Al(R_{10})—O]a-$ [Chemical Formula 2]

in Chemical Formula 2, $R_{10}$ is halogen; or $C_{1-20}$ hydrocarbyl substituted or unsubstituted with halogen; and a is an integer of 2 or more, $D(R_{11})_3$ [Chemical Formula 3]

in Chemical Formula 3,

D is aluminum or boron; and $R_{11}$ is halogen; or $C_{1-20}$ hydrocarbyl substituted or unsubstituted with halogen, $[L-H]^+[ZA_4]^-$ or $[L]^+[ZA_4]^-$ [Chemical Formula 4]

in Chemical Formula 4,

L is a neutral or cationic Lewis base;

H is a hydrogen atom;

Z is a group 13 element; and

A's are each independently $C_6$-20 aryl or $C_{1-20}$ alkyl, of which one or more hydrogen atoms are substituted with halogen, $C_{1-20}$ hydrocarbyl, $C_{1-20}$ alkoxy, or phenoxy.

The compound represented by Chemical Formula 2 may serve as an alkylating agent and an activating agent, the compound represented by Chemical Formula 3 may serve as an alkylating agent, and the compound represented by Chemical Formula 4 may serve as an activating agent.

The compound represented by Chemical Formula 2 is not particularly limited as long as it is alkylaluminoxane, and it may be, for example, methylaluminoxane, ethylaluminoxane, isobutylaluminoxane, butylaluminoxane, etc., and preferably, methylaluminoxane.

The compound represented by Chemical Formula 3 is not particularly limited, as long as it is an alkyl metal compound, and it may be, for example, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and it may be preferably selected from trimethylaluminum, triethylaluminum, and triisobutylaluminum.

Examples of the compound represented by Chemical Formula 4 may include triethylammoniumtetraphenylboron, trimethylammoniumtetraphenylboron, tributylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra (p-trifluoromethylphenyl)boron, trimethylammoniumtetra (p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenylcarboniumtetra(p-trifluoromethylphenyl) boron, triphenylcarboniumtetrapentafluorophenylboron, etc. Preferably, aluminoxane maybe used, and more preferably, methylaluminoxane (MAO) which is alkylaluminoxane may be used.

The supporting amount of the cocatalyst may be about 3 mmol to about 25 mmol, or about 5 mmol to about 20 mmol, based on 1 g of the support.

Meanwhile, the catalyst composition may be prepared by a method of preparing the catalyst composition including the support on which the cocatalyst and the metallocene compound are supported, the method including the steps of supporting the cocatalyst on the support; and supporting the metallocene compound on the support on which the cocatalyst has been supported.

In the method, the supporting conditions are not particularly limited, and the supporting may be performed within the range well-known to those skilled in the art. For example, high-temperature supporting and low-temperature supporting may be appropriately performed, and the supporting temperature may be, for example, in the range of about −30° C. to about 150° C., preferably about 50° C. to about 98° C., or about 55° C. to about 95° C. The supporting time may be appropriately controlled depending on the amount of a first metallocene compound to be supported. The supported catalyst thus reacted may be used as it is after removing the reaction solvent by filtration or distillation under reduced pressure, and if necessary, it may be used after soxhlet filtering with aromatic hydrocarbon such as toluene.

In addition, the preparation of the supported catalyst may be carried out in the presence or absence of a solvent. When a solvent is used, applicable solvents may include aliphatic hydrocarbon solvents such as hexane or pentane, aromatic hydrocarbon solvents such as toluene or benzene, hydrocarbon solvents substituted with a chlorine atom such as dichloromethane, ether solvents such as diethyl ether or tetrahydrofuran (THF), organic solvents such as acetone, ethylacetate, etc. Hexane, heptane, toluene, or dichloromethane is preferred.

Meanwhile, the polyethylene according to one embodiment of the present invention may be prepared by a method of preparing polyethylene, the method including the step of polymerizing polyethylene in the presence of the catalyst composition including the metallocene compound.

The method of preparing polyethylene may be carried out by a slurry polymerization method by using ethylene and alpha-olefin as raw materials in the presence of the above-described catalyst composition and by applying a common apparatus and contact technology.

The method of preparing polyethylene may copolymerize ethylene and alpha-olefin using a continuous slurry polymerization reactor, a loop slurry reactor, etc., but is not limited thereto.

Specifically, the copolymerization step may be performed by reacting about 0.45 mole or less or about 0.1 mole to about 0.45 mole, or about 0.4 mole or less or about 0.2 mole to about 0.4 mole, or about 0.35 mole or less or about 0.25 mole to about 0.35 mole of alpha-olefin, based on 1 mole of ethylene.

The method of preparing polyethylene is characterized in that it is not necessary to increase the comonomer content in order to lower the product density, and thus the process is stable and a high drop impact strength of the product may be reproduced.

In addition, the alpha-olefin may be one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene, 1-eicocene, and mixtures thereof.

Specifically, in the method of preparing polyethylene, for example, 1-hexene may be used as the alpha-olefin. Accordingly, in the slurry polymerization, an ultra-low density polyethylene copolymer may be prepared by polymerizing the ethylene and 1-hexene.

Further, the polymerization temperature may be about 25° C. to about 500° C., or about 25° C. to about 300° C., or about 30° C. to about 200° C., or about 50° C. to about 150° C., or about 60° C. to about 120° C. Further, the polymerization pressure may be about 1 $kgf/cm^2$ to about 100 $kgf/cm^2$, or about 1 $kgf/cm^2$ to about 50 $kgf/cm^2$, or about 5 $kgf/cm^2$ to about 45 $kgf/cm^2$, or about 10 $kgf/cm^2$ to about 40 $kgf/cm^2$, or about 15 $kgf/cm^2$ to about 35 $kgf/cm^2$.

The catalyst composition including the metallocene compound of Chemical Formula 1 according to the present invention may be injected after being dissolved or diluted in an aliphatic hydrocarbon solvent having 5 to 12 carbon atoms, for example, pentane, hexane, heptane, nonane, decane, and isomers thereof, and an aromatic hydrocarbon solvent such as toluene and benzene, or a hydrocarbon solvent substituted with a chlorine atom such as dichloromethane and chlorobenzene. The solvent used herein is preferably used after removing a small amount of water or air, which acts as a catalyst poison, by treating with a small amount of alkyl aluminum. It is possible to further use the cocatalyst.

For example, the polymerization step may be performed by injecting about 800 ppm or less or about 0 to about 800 ppm, or about 300 ppm or less or about 10 ppm to about 300 ppm, or about 100 ppm or less or about 15 ppm to about 100 ppm of hydrogen gas, based on the amount of ethylene.

In such a process of copolymerizing ethylene, the catalyst composition including the metallocene compound of the present invention may exhibit high catalytic activity. For example, during ethylene copolymerization, the catalytic activity may be about 4.0 kg PE/g·cat·hr or more or about 4.0 kg PE/g·cat·hr to about 50 kg PE/g·cat·hr, when calculated as a ratio of the weight (kg PE) of the produced polyethylene per the weight (g) of the catalyst composition used, based on the unit time (hr). Specifically, the activity of the catalyst composition may be about 4.2 kg PE/g·cat·hr or more, or about 4.3 kg PE/g·cat·hr or more, or about 4.5 kg PE/g·cat·hr or more, or about 40 kg PE/g·cat·hr or less, or about 30 kg PE/g·cat·hr or less, or about 15 kg PE/g·cat·hr or less.

As described above, according to the present invention, polyethylene may be prepared by copolymerizing ethylene and alpha-olefin using the catalyst composition including the metallocene compound of Chemical Formula 1 described above.

In this regard, the prepared polyethylene may be an ethylene 1-hexene copolymer.

The method of preparing polyethylene may provide polyethylene having excellent physical properties by performing slurry polymerization in the presence of the above-described catalyst composition.

In particular, the catalyst composition including the metallocene compound of Chemical Formula 1 according to the present invention may exhibit high activity as described above during copolymerization of ethylene and alpha-olefin, and may increase the content of short chain branch (SCB) in the molecule together with a high molecular weight without excessively increasing the content of the alpha-olefin comonomer.

The polyethylene of the present invention, which is prepared by the above-described preparation method of one embodiment, has a narrow molecular weight distribution and low crystallinity within a similar melt index (MI) range. Thus, the effective number of physical cross-links of the molecule is increased, lint or dust generation is reduced during a drawing process, and abrasion resistance is improved. Accordingly, the polyethylene may be suitably applied to fiber products.

Hereinafter, preferred exemplary embodiments are provided for better understanding of the present invention. However, the following exemplary embodiments are provided only for understanding the present invention more easily, but the content of the present invention is not limited thereby.

EXAMPLE

Synthesis Example 1

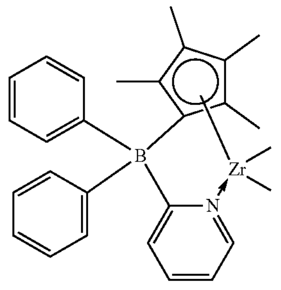

2-Bromopyridine (1 eq.) was dissolved in tetrahydrofuran (0.1 M), and then n-butyllithium (1 eq.) was slowly added dropwise at −90° C., followed by stirring at the same temperature for 1 hour. Then, chlorodiphenylborane (1 eq.) was dissolved in toluene (0.3 M), which was then slowly added dropwise to the first reaction product at −78° C., followed by stirring for 1 hour. Thereafter, stirring was performed at room temperature for 12 hours, and the solvent was dried under vacuum, and toluene was added, and a filtrate obtained by removing solids through a filter was dried under vacuum to obtain diphenyl(pyridin-2-yl)borane.

The diphenyl(pyridin-2-yl)borane (1 eq.) was dissolved in tetrahydrofuran (0.1 M), and then a solution of lithium tetramethylcyclopentadienide ($Li(CpMe_4)$, 1 eq.) dissolved in tetrahydrofuran (0.1 M) was slowly added dropwise at 0° C., followed by stirring at room temperature overnight. The solvent was dried under vacuum, and toluene/diethyl ether (volume ratio of 3/1, 0.3 M) was introduced to dissolve, and $MCl_4$ (1 eq.) was mixed with toluene (0.2 M), which was then introduced at −78° C., followed by stirring at room temperature overnight. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered and dried under vacuum to obtain dichloro{diphenyl(pyridin-2-yl-κN)($\eta^5$-2,3,4,5-tetramethylcyclopenta-2,4-dien-1-ylidene)borate}zirconium (IV).

Dichloro{diphenyl(pyridin-2-yl-κN)($\eta^5$-2,3,4,5-tetramethylcyclopenta-2,4-dien-1-ylidene)borate}zirconium(IV) (1 eq.) was dissolved in toluene/diethyl ether (volume ratio of 3/1, 0.3 M), and then a solution of methyl lithium (2 eq.) dissolved in hexane or diethyl ether was slowly added dropwise at −78° C., followed by stirring at room temperature for 12 hours. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered, and dried under vacuum to obtain a precursor compound.

1H NMR (500 MHz, $CDCl_3$, ppm)=δ 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H)

Synthesis Example 2

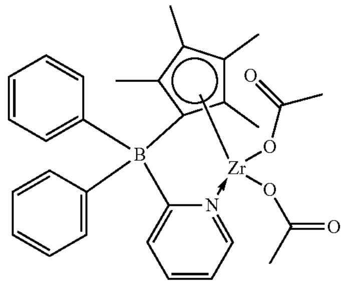

2-Bromopyridine (1 eq.) was dissolved in tetrahydrofuran (0.1 M), and then n-butyllithium (1 eq.) was slowly added dropwise at −90° C., followed by stirring at the same temperature for 1 hour. Then, chlorodiphenylborane (1 eq.) was dissolved in toluene (0.3 M), which was then slowly added dropwise to the first reaction product at −78° C., followed by stirring for 1 hour. Thereafter, stirring was performed at room temperature for 12 hours, and the solvent was dried under vacuum, and toluene was added, and a filtrate obtained by removing solids through a filter was dried under vacuum to obtain diphenyl(pyridin-2-yl)borane.

The diphenyl(pyridin-2-yl)borane (1 eq.) was dissolved in tetrahydrofuran (0.1 M), and then a solution of lithium tetramethylcyclopentadienide (Li(CpMe$_4$), 1 eq.) dissolved in tetrahydrofuran (0.1 M) was slowly added dropwise at 0° C., followed by stirring at room temperature overnight. The solvent was dried under vacuum, and toluene/diethyl ether (volume ratio of 3/1, 0.3 M) was introduced to dissolve, and MCl$_4$ (1 eq.) was mixed with toluene (0.2 M), which was then introduced at −78° C., followed by stirring at room temperature overnight. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered and dried under vacuum to obtain dichloro{diphenyl(pyridin-2-yl-κN)(η$^5$-2,3,4,5-tetramethylcyclopenta-2,4-dien-1-ylidene) b orate}zirconium (IV).

Dichloro{diphenyl(pyridin-2-yl-κN)(η$^5$-2,3,4,5-tetramethylcyclopenta-2,4-dien-1-ylidene) borate}zirconium(IV) (1 eq.) was dissolved in toluene/diethyl ether (volume ratio of 3/1, 0.3 M), and then a solution of sodium acetate (2 eq.) dissolved in hexane or diethyl ether was slowly added dropwise at −78° C., followed by stirring at room temperature for 12 hours. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered, and dried under vacuum to obtain a precursor compound.

1H NMR (500 MHz, CDCl$_3$, ppm)=δ 8.35 (d, 1H), 8.04 (d, 4H), 7.72 (t, 1H), 7.45 (t, 1H), 7.35 (t, 4H), 7.20 (d, 1H), 7.11 (t, 2H), 2.12 (s, 6H), 2.01 (s, 6H), 1.88 (s, 6H)

Synthesis Example 3

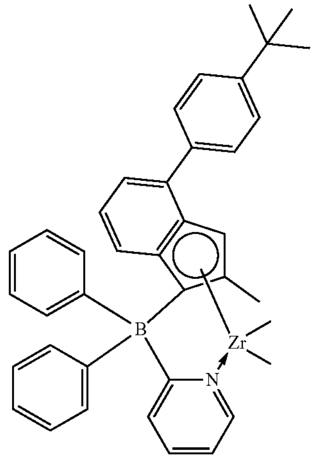

A dimethyl{diphenyl(pyridin-2-yl-κN)(η$^5$-2-methyl-4-(4-tertbutylphenyl) indenylidene) borate}zirconium(IV) precursor compound was obtained in the same manner as in that lithium Synthesis Example 1, except 2-methyl-4-(4-tertbutylphenyl)-indenide was used instead of lithium tetramethylcyclopentadienide (Li(CpMe$_4$)).

1H NMR (500 MHz, CDCl$_3$, ppm)=δ 8.34 (d, 1H), 8.13 (d, 4H), 8.05 (d, 1H), 7.79-74 (m, 2H), 7.47 (t, 1H), 7.41-7.39 (m, 6H), 7.35 (m, 3H), 7.23 (d, 1H), 7.20 (t, 2H), 6.66 (s, 1H), 2.09 (s, 3H), 1.49 (s, 9H), 0.94 (s, 6H) ppm.

Synthesis Example 4

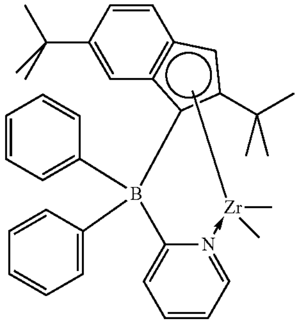

A dimethyl{diphenyl(pyridin-2-yl-κN)(η$^5$-2,7-di-tert-butyl-9H-fluorene-9-ylidene) borate}zirconium(IV) precursor compound was obtained in the same manner as in Synthesis Example 1, except that lithium 2,7-di-tert-butyl-9H-fluorene-9-ylidene was used instead of lithium tetramethylcyclopentadienide (Li(CpMe$_4$)).

1H NMR (500 MHz, CDCl$_3$, ppm)=δ 8.40 (d, 1H), 8.12 (d, 4H), 8.09 (d, 2H), 7.73-7.70 (m, 3H), 7.50 (t, 1H), 7.40-7.36 (m, 6H), 7.19 (d, 1H), 7.14 (t, 2H), 1.44 (s, 18H), 0.90 (s, 6H) ppm Synthesis Example 5

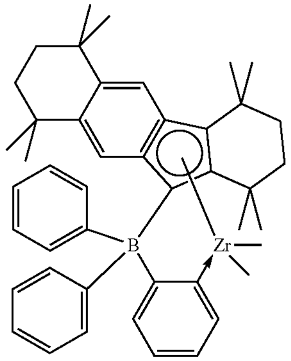

A dimethyl{diphenyl(pyridin-2-yl-κN)($\eta^5$-1,2,3,4,7,8,9,10-octahydro-1,1,4,4,7,7,10,10-octa methyl-12H-dibenzo[b,h]fluoren-12-ylidene)borate}zirconium(IV) precursor compound was obtained in the same manner as in Synthesis Example 1, except that lithium 1,2,3,4,7,8,9,10-octahydro-1,1,4,4,7,7,10,10-octamethyl-12H-dibenzo[b,h]fluoren-12-ylidene was used instead of lithium tetramethylcyclopentadienide (Li($CpMe_4$)).

1H NMR (500 MHz, $CDCl_3$, ppm)=δ 8.42 (d, 1H), 8.13 (d, 4H), 8.07 (s, 2H), 7.74 (t, 1H), 7.53 (s, 2H), 7.44 (t, 1H), 7.42 (t, 4H), 7.26 (d, 1H), 7.10 (t, 2H) 1.66 (m, 4H), 1.46 (m, 4H), 1.30-0.99 (m, 24H), 0.94 (s, 6H) ppm.

Synthesis Example 6

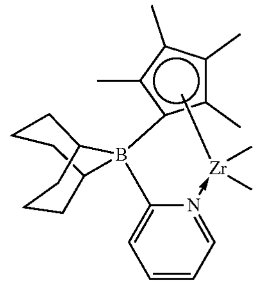

A dimethyl{(cyclooctan-1,5-diyl)(pyridin-2-yl-κN)($\eta^5$-2,3,4,5-tetramethylcyclopenta-2,4-dien-1-ylidene) borate}zirconium(IV) precursor compound was obtained in the same manner as in Synthesis Example 1, except that (1s,5s)-9-chloro-9-borabicyclo[3.3.1]nonane was used instead of chlorodiphenylborane.

1H NMR (500 MHz, $CDCl_3$, ppm)=δ 8.49 (d, 1H), 7.70 (t, 1H), 7.41 (t, 1H), 7.21 (d, 1H), 2.16 (s, 6H), 2.05-1.85 (m, 12H), 1.69-1.60 (m, 4H), 1.52 (br m, 2H), 1.02 (br m, 2H), 0.93 (s, 6H) ppm.

<Preparation Example of Supported Catalyst>

Preparation Example 1

50 mL of toluene was put in a pico reactor, and 7 g of silica gel (SYLOPOL 952X, calcinated under 250° C.) was added under Ar, and 10 mmol of methylaluminoxane (MAO) was slowly introduced at room temperature, and allowed to react under stirring at 95° C. for 24 hours. When the reaction was completed, the mixture was cooled to room temperature and left for 15 minutes to decant the solvent with a cannula. Toluene (400 mL) was added, stirred for 1 minute, and left for 15 minutes to decant the solvent with a cannula.

60 μmol of the metallocene compound of Synthesis Example 1 was dissolved in 30 mL of toluene, and then transferred to the reactor with a cannula, and allowed to react under stirring at 80° C. for 2 hours. When the reaction was completed and precipitation was completed, the product was cooled to room temperature and left for 15 minutes to decant the solvent with a cannula. The supernatant was removed and the resulting reaction product was washed with toluene. After further washing with hexane, N,N-bis(2-hydroxyethyl)pentadecylamine(N,N-Bis(2-hydroxyethyl) pentadecylamine, Atmer 163) as an anti-static agent was dissolved in an amount of 2 wt %, based on the weight (g) of silica, in 3 mL of hexane, and introduced, followed by stirring at room temperature for 10 minutes. When the reaction was completed and precipitation was completed, the supernatant was removed and the resulting product was transferred using a glass filter to remove the solvent.

Primary drying was performed at room temperature under vacuum for 5 hours, and secondary drying was performed at 45° C. under vacuum for 4 hours to obtain a silica-supported metallocene catalyst in the form of solid particles.

Preparation Example 2 to Preparation Example 6

Each silica-supported metallocene catalyst was prepared in the same manner as in Preparation Example 1, except that each of the metallocene compounds of Synthesis Example 2 to Synthesis Example 6 was used instead of the metallocene compound of Synthesis Example 1.

Comparative Preparation Example 1

A silica-supported metallocene catalyst was prepared in the same manner as in Preparation Example 1, except that $[tBu-O—(CH_2)_6—C_5H_4]_2ZrCl_2$ was used instead of the metallocene compound of Synthesis Example 1.

Example of Polyethylene Polymerization

Example 1

A polyethylene (ethylene-1-hexene copolymer) was prepared in the presence of the supported catalyst obtained in Preparation Example 1, and a detailed method is as follows.

A 600 mL stainless reactor was subjected to vacuum drying at 120° C., and cooled, and 1 g of trimethylaluminum (TMA) was added to 250 g of hexane at room temperature, followed by stirring for 10 minutes. The reacted hexane was completely removed, and then 250 g of hexane and 0.5 g of triisobutylaluminum (TIBAL) were added, followed by stirring for 5 minutes. Thereafter, 7 mg of the supported catalyst obtained in Preparation Example 1 was added, followed by stirring while raising the temperature to 80° C. After stopping stirring at 80° C., 10 mL of a comonomer 1-hexene (C6) was added, ethylene (C2) was filled to 15 bar, and stirring was started. After polymerization for 30 minutes, unreacted C2 was vented.

Example 2 to Example 6

Each polyethylene was prepared in the same manner as in Example 1, except that each of the supported catalysts of Preparation Example 2 to Preparation Example 6 was used instead of the supported catalyst of Preparation Example 1.

Comparative Example 1

ASPUN™ 6835A Fiber Resin (Dow Chemical Company) was used as a polyethylene of Comparative Example 1.

Comparative Example 2

SK MK910 (SK Global Chemical) was used as a polyethylene of Comparative Example 2.

Comparative Example 3

ASPUN™ 6850A Fiber Resin (Dow Chemical Company) was used as a polyethylene of Comparative Example 3.

Comparative Example 4

SK MM810 (SK Global Chemical) was used as a polyethylene of Comparative Example 4.

Comparative Example 5

A polyethylene was prepared in the same manner as in Example 1, except that the supported catalyst of Comparative Preparation Example 1 was used instead of the supported catalyst of Preparation Example 1.

Experimental Example

Physical properties were measured for the polyethylenes prepared in Examples and Comparative Examples as follows, and the results are shown in Table 1 below.

(1) Melt Index (MI, g/10 Min)

The melt index was measured at 190° C. under a load of 2.16 kg according to ASTM D1238, and the weight (g) of the polymer melted for 10 minutes was recorded as the melt index.

(2) Molecular Weight Distribution (MWD, Mw/Mn)

The molecular weight distribution (MWD, Mw/Mn) was determined by measuring a weight average molecular weight (Mw) and a number average molecular weight (Mn) of the polyethylene using gel permeation chromatography (GPC, manufactured by Water), and then dividing the weight average molecular weight by the number average molecular weight.

In detail, PL-GPC220 manufactured by Waters was used as the gel permeation chromatography (GPC) instrument, and a Polymer Laboratories PLgel MIX-B column with a length of 300 mm was used. At this time, the measurement temperature was 160° C., 1,2,4-trichlorobenzene was used as a solvent, and the flow rate was set to 1 mL/min. The polymer samples of Examples and Comparative Examples were pretreated by dissolving each of them in 1,2,4-trichlorobenzene containing 0.0125% of BHT at 160° C. for 10 hours using a GPC analyzer (PL-GP220), and prepared at a concentration of 10 mg/10 mL, and fed in an amount of 200 μL. A calibration curve formed using polystyrene standards was used to measure Mw and Mn values. 9 kinds of polystyrene standards having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

(3) Crystallinity

The crystallinity was measured using a differential scanning calorimeter (DSC) according to ASTM F2625.

In detail, DSC2500 (TA Instruments) as the differential scanning calorimeter (DSC) was used to heat the polyethylene copolymer to 200° C. and maintained for 3 minutes, and then cooled to 0° C., followed by heating again. At this time, the heating rate and cooling rate were 10° C./min, respectively and Tm was obtained from the second heating run. At this time, the crystallinity was calculated by the following Equation 1. Theoretically, it is known that ΔH (at 100%) of PE is 293 J/g.

$$\text{Crystallinity (\%)}=\Delta H(\text{heat of fusion, endothermic enthalpy measured during melting transition, width of melting peak})/\Delta H(\text{at }100\%)\ (\text{endothermic enthalpy of }100\%\text{ crystalline material }(100\%))=\Delta H(\text{heat of fusion, endothermic enthalpy measured during melting transition, width of melting peak})/293\text{ J/g} \quad \text{[Equation 1]}$$

(4) $T_{cr}$ (Crystal Relaxation Temperature)

Rheological properties according to the temperature of injection molded specimens were evaluated using a dynamic mechanical analyzer (DMA), and determined as $T_{cr}$.

In more detail, the polyethylene samples of Examples and Comparative Examples were pressurized at 190° C. to prepare rectangular specimens with a thickness of 0.5 mm, a width of 6 mm, and a length of 30 mm. Each polyethylene specimen was mounted on Q800 DMA of TA Instruments, and the storage modulus E' and loss modulus E" were measured by applying a periodic deformation while raising the temperature from −80° C. to 140° C. at a rate of 5° C. per minute. Tan (delta), which is a value obtained by dividing the loss modulus at each temperature by the storage modulus, was obtained, and the temperature at the maximum tan (delta) was determined as the crystal relaxation temperature.

(5) Abrasion Resistance

With respect to the polyethylenes of Examples and Comparative Examples, master batch pellets were extruded into microfiber webs to produce each nonwoven fabric with reference to a literature [Report No. 4364 of the Naval Research Laboratories, published May 25, 1954 entitled "Manufacture of Superfine Organic Fibers" by Wente, Van. A. Boone, C. D., and Fluharty, E. L.].

In detail, a master batch was prepared by mixing each of the polyethylene resins of Examples and Comparative Examples with an IF168 additive (1000 ppm), and then pelletized using a 25 mm twin-screw extruder. Subsequently, a 31 mm Brabender conical twin screw extruder was used to feed the molten masterbatch composition and LG H7550 Polypropylene at a weight fraction ratio of 1:1 to a melt pump (65 rpm), and to a 25 cm width-melt blowing die having orifices (10 orifices/cm) and orifice diameter of 381 μm. The melt temperature was 210° C., the screw speed was 120 rpm, the die was maintained at 210° C., the primary air temperature and pressure were, respectively, 270° C. and 54 kPa (7.8 psi), the polymer throughput rate was 5.2 kg/hr, and the collector/die distance was 15.0 cm. While the microfibers spun from the orifices fell to the collector, they were cooled by a cooling air using two pumps, and the microfibers collected by the collector were passed through a calendering process using upper and lower rolls to produce each nonwoven fabric. At this time, the temperatures of the cooling air was 16° C., and the temperatures of the upper and lower rolls in the calendaring process were 160° C./155° C., respectively.

Abrasion resistance of the nonwoven fabrics thus prepared was measured using a Sutherland Ink Rub Tester 2000 with reference to ASTM D5264.

In more detail, the fibers to which each of the samples of Examples and Comparative Examples was applied were prepared as cloth specimens having a size of 11.0 cm×4.0 cm, and sanded (20 cycles, 42 cycles/min) with a 320 grit sandpaper (Sutherland Ink Rub Tester 2000), and the amount of loose fiber per unit area was measured.

In other words, the abrasion resistance was calculated by abrasion resistance (mg/cm$^2$)=total weight of loose fiber/surface area, and as the amount of loose fiber per unit area was smaller, it was determined as high abrasion resistance.

TABLE 1

| | $MI_{2.16}$ (g/10 min) | MWD | Crystallinity (%) | $T_{cr}$ (° C.) | MFRR ($MI_5/MI_{2.16}$) | Density (g/cm$^3$) | Abrasion resistance (mg/cm$^2$) |
|---|---|---|---|---|---|---|---|
| Example 1 | 19.2 | 2.45 | 63 | 43.3 | 2.54 | 0.952 | 0.1 |
| Example 2 | 19.5 | 2.46 | 68 | 46 | 2.52 | 0.953 | 0.12 |
| Example 3 | 18.9 | 2.39 | 70 | 48 | 2.53 | 0.954 | 0.14 |
| Example 4 | 20 | 2.38 | 65 | 44 | 2.50 | 0.951 | 0.11 |
| Example 5 | 24.4 | 2.45 | 71 | 46.2 | 2.66 | 0.955 | 0.12 |
| Example 6 | 29.7 | 2.35 | 69 | 46.8 | 2.54 | 0.951 | 0.13 |
| Comparative Example 1 | 19.4 | 2.79 | 65 | 42.9 | 2.71 | 0.950 | 0.22 |
| Comparative Example 2 | 19.6 | 2.71 | 71 | 49.1 | 2.71 | 0.955 | 0.3 |
| Comparative Example 3 | 28.1 | 2.64 | 66 | 45.5 | 2.70 | 0.954 | 0.25 |
| Comparative Example 4 | 30.8 | 2.61 | 70 | 45.7 | 2.69 | 0.954 | 0.26 |
| Comparative Example 5 | 18.3 | 2.47 | 74 | 51.5 | 2.58 | 0.954 | 0.33 |

Referring to Table 1, the polyethylenes of Examples 1 to 6 of the present invention showed excellent abrasion resistance of 0.2 mg/cm$^3$ or less, as compared with those of Comparative Examples 1 to 5 having the similar melt index.

What is claimed is:

1. A polyethylene polymer satisfying the following conditions of 1) to 4):

1) A melt index (MI) of 0.5 g/10 min to 40 g/10 min, as measured at 190° C. under a load of 2.16 kg according to ASTM D1238;

2) A molecular weight distribution (MWD) of 2.3 to 2.6;

3) A crystallinity of 63% to 71%, as measured using a differential scanning calorimeter (DSC) according to ASTM F2625; and 4) A crystal relaxation temperature ($T_{cr}$) of 42° C. to 50° C., as measured using dynamic mechanical analysis (DMA).

2. The polyethylene polymer of claim 1, wherein the melt index (MI) is 18 g/10 min to 40 g/10 min, as measured at 190° C. under a load of 2.16 kg according to ASTM D1238.

3. The polyethylene polymer of claim 1, wherein an abrasion resistance is 0.2 mg/cm$^3$ or less, as measured according to ASTM D5264.

4. The polyethylene polymer of claim 1, wherein the polyethylene polymer is a copolymer of ethylene and an alpha-olefin.

5. The polyethylene polymer of claim 4, wherein the alpha-olefin includes one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, and 3-chloromethylstyrene.

6. The polyethylene polymer of claim 1, wherein the polyethylene polymer is prepared by copolymerizing ethylene and an alpha-olefin in the presence of a catalyst composition including a metallocene compound represented by Chemical Formula 1:

[Chemical Formula 1]

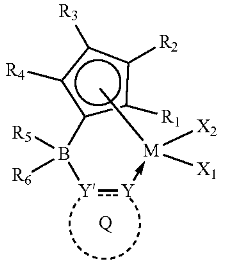

wherein, in Chemical Formula 1,

B is boron,

M is a Group 4 transition metal, $R_1$ to $R_4$ are each independently hydrogen, $C_{1-20}$ alkyl, $C_{3-20}$ cycloalkyl, or $C_{6-20}$ aryl, or optionally $R_1$ and $R_2$ or $R_3$ and $R_4$ are bonded to each other to form a substituted or unsubstituted $C_{6-60}$ aromatic ring, $R_5$ and $R_6$ are each independently $C_{1-20}$ alkyl, $C_{3-20}$ cycloalkyl, or $C_{6-20}$ aryl, or optionally $R_5$ and $R_6$ are bonded to each other to form a $C_{3-60}$ aliphatic ring or a $C_{6-60}$ aromatic ring, $X_1$ and $X_2$ are each independently $C_{1-20}$ alkyl or —O(CO)R', wherein R' is $C_{1-20}$ alkyl, Q is a substituted or unsubstituted $C_{2-60}$ hetero ring including any one or more selected from the group consisting of N, O, and S, Y and Y' are elements constituting Q, Y is N, O, or S, Y' is N or C.

7. The polyethylene polymer of claim 6, wherein $R_1$ to $R_4$ are each independently hydrogen or methyl, or optionally $R_1$ and $R_2$ or $R_3$ and $R_4$ are bonded to each other to form a benzene ring or a 1,2,3,4-tetrahydronaphthalene ring, wherein the benzene ring or the 1,2,3,4-tetrahydronaphthalene ring is unsubstituted or substituted with 1 to 4 substituents selected from the group consisting of methyl, tert-butyl, and 4-tert-butyl phenyl.

8. The polyethylene polymer of claim 6, wherein $R_5$ and $R_6$ are each independently methyl or phenyl, or optionally $R_5$ and $R_6$ are bonded to each other to form a cyclooctane ring.

9. The polyethylene polymer of claim 6, wherein the compound represented by Chemical Formula 1 is any one of compounds represented by the following structural formulae:

-continued
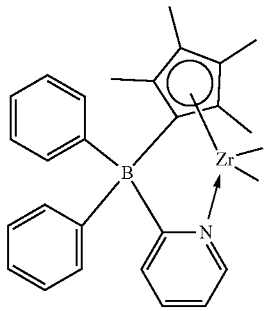
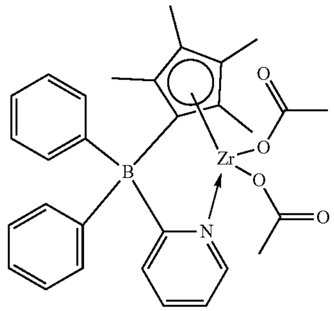
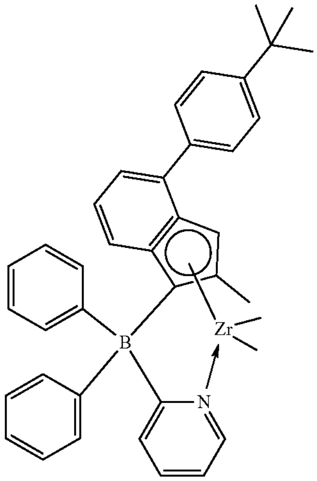
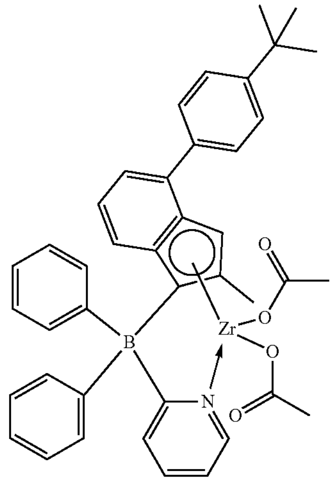
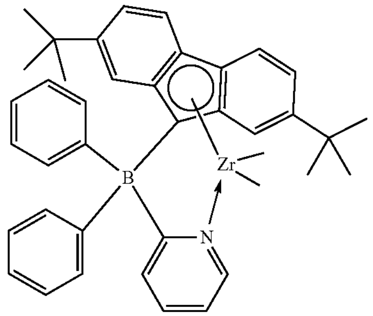
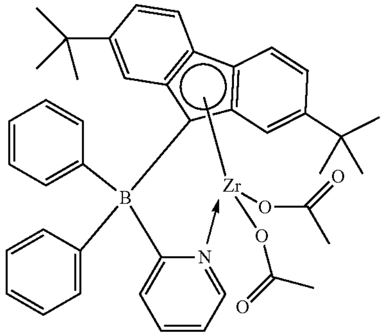
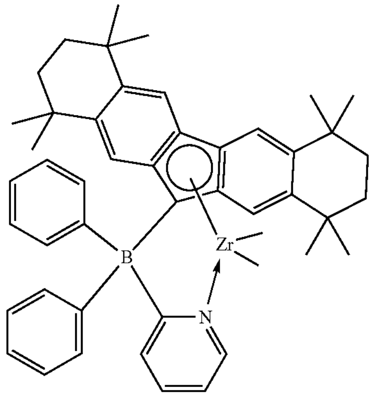
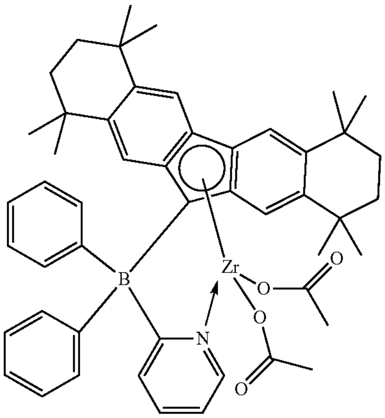

-continued
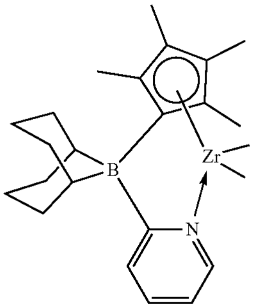
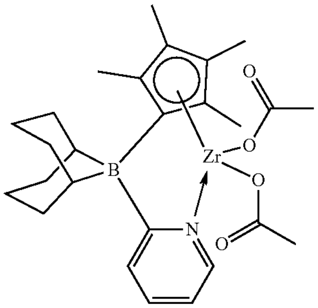
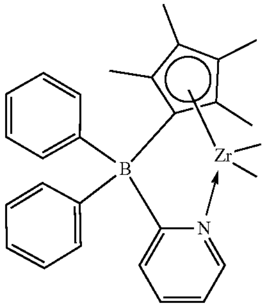
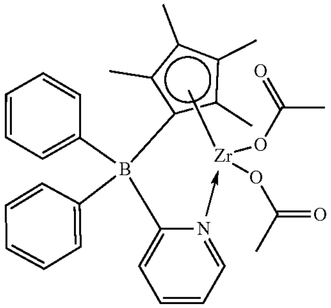
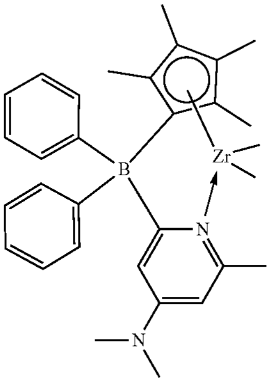
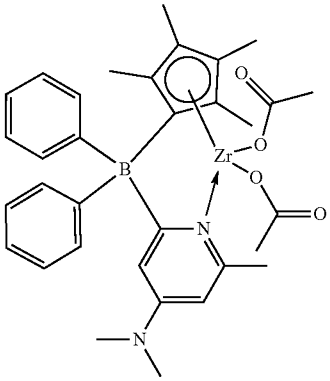
-continued
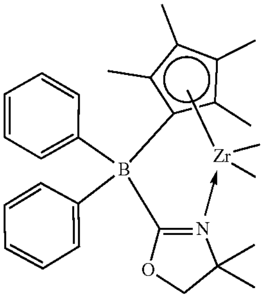
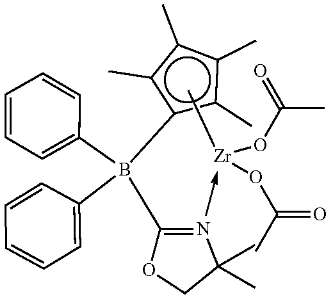
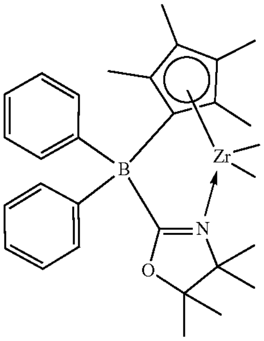
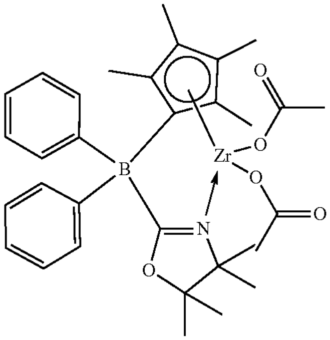
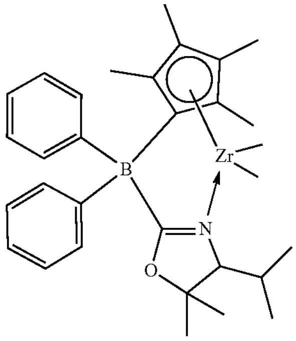

-continued

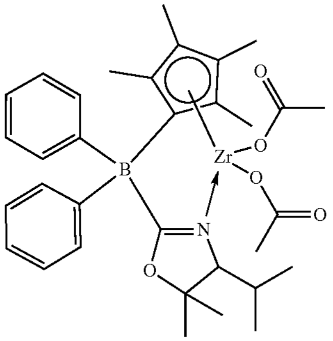

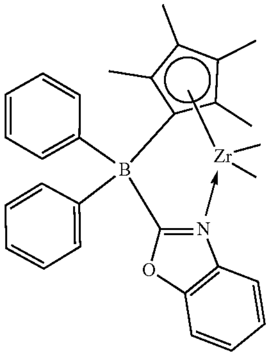

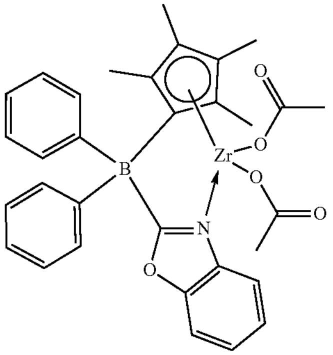

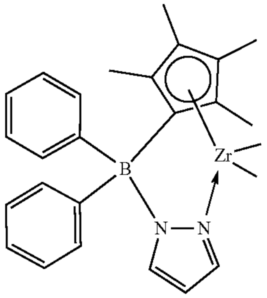

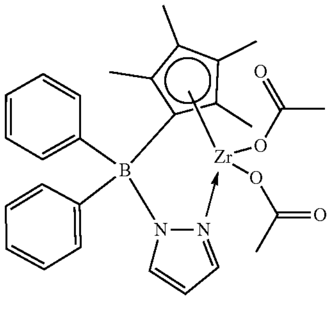

-continued

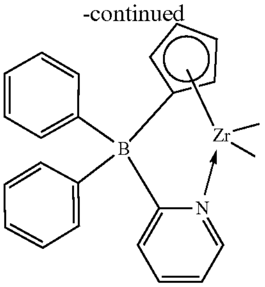

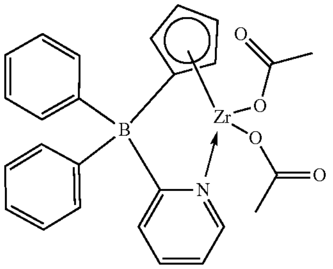

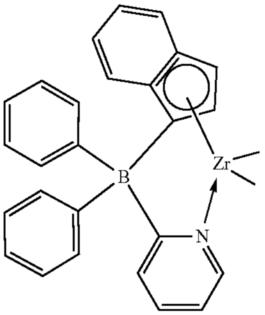

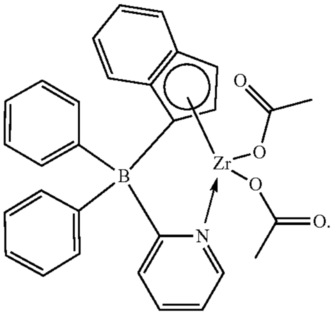

10. The polyethylene polymer of claim 6, wherein the catalyst composition further includes one or more cocatalyst compounds selected from the group consisting of compounds represented by Chemical Formulae 2 to 4:

$[Al(R_{10})—O]a$- [Chemical Formula 2]

wherein, in Chemical Formula 2, $R_{10}$ is halogen or $C_{1-20}$ hydrocarbyl substituted or unsubstituted with halogen; and a is an integer of 2 or more, $D(R_{11})_3$ [Chemical Formula 3]

wherein, in Chemical Formula 3,

D is aluminum or boron; and $R_{11}$ is halogen or $C_{1-20}$ hydrocarbyl substituted or unsubstituted with halogen, $[L-H]^+[ZA_4]^-$or $[L]^+[ZA_4]^-$ [Chemical Formula 4]

wherein, in Chemical Formula 4,

L is a neutral or cationic Lewis base;

H is a hydrogen atom;

Z is a group 13 element; and plural As are each independently $C_{6-20}$ aryl or $C_{1-20}$ alkyl, of which one or more hydrogen atoms are substituted with halogen, $C_{1-20}$ hydrocarbyl, $C_{1-20}$ alkoxy, or phenoxy.

* * * * *